United States Patent [19]

Maeda et al.

[11] Patent Number: 4,569,958
[45] Date of Patent: Feb. 11, 1986

[54] SCORCH-INHIBITED ELASTOMERIC COMPOSITION

[75] Inventors: Akio Maeda, Yokohama; Mitsuyoshi Aonuma, Tokyo; Masahiko Muranishi, Kamakura, all of Japan

[73] Assignee: Nippon Zeon Co Ltd, Tokyo, Japan

[21] Appl. No.: 750,995

[22] Filed: Jul. 2, 1985

Related U.S. Application Data

[63] Continuation of Ser. No. 591,836, Mar. 21, 1984, abandoned.

[30] Foreign Application Priority Data

Mar. 23, 1983 [JP] Japan ................................ 58-48434
May 2, 1983 [JP] Japan ................................ 58-76209

[51] Int. Cl.$^4$ .............................................. C08K 5/39
[52] U.S. Cl. ................................... 524/100; 524/102; 524/112; 524/288; 524/296; 524/321

[58] Field of Search ............... 524/100, 102, 112, 288, 524/296, 321

[56] References Cited

U.S. PATENT DOCUMENTS 2,213,954 9/1940 Crawford ............................ 524/296
4,222,915 9/1980 Wolff et al. ......................... 524/574

Primary Examiner—John Kight
Assistant Examiner—Kriellion Morgan
Attorney, Agent, or Firm—Sherman & Shalloway

[57] ABSTRACT

An elastomeric composition whose scorch is inhibited comprises [I] a halogen-containing elastomer, [II] a di- or tri-thiol-s-triazine compound and [III] at least one polycarboxylic acid compound selected from the group consisting of (A) a polycarboxylic acid having at least two carboxyl groups capable of forming an acid anhydride group in the molecule and (B) a halogen-substituted polycarboxylic acid anhydride.

11 Claims, No Drawings

SCORCH-INHIBITED ELASTOMERIC COMPOSITION

This application is a continuation of application Ser. No. 591,836, filed Mar. 21, 1984, now abandoned.

This invention relates to an elastomer composition whose scorch is inhibited, said composition comprising a halogen-containing elastomer, a di- or tri-thiol-s-triazine compound and a specified polycarboxylic acid compound.

It is known that di- or -tri-thiol-s-triazine compounds are effective as a vulcanization agent for halogen-containing elastomers, and the use of these compounds improves heat aging resistance and mold staining over conventional vulcanization methods and gives a good permanent compression set. Rubber compounds containing this type of vulcanizer, however, undergo scorch depending upon the molding conditions.

It is an object of this invention to provide an elastomer composition in which the scorch of a halogen-containing elastomer by the di- or tri-thiol-s-triazine compound can be inhibited.

This object is achieved in accordance with this invention by a composition comprising [I] a halogen-containing elastomer, [II] a di- or tri-thiol-s-triazine compound and [III] at least one polycarboxylic acid compound selected from the group consisting of (A) a polycarboxylic acid having at least two carboxyl groups capable of forming an acid anhydride group in the molecule and (B) a halogen-substituted polycarboxylic acid anhydride.

Examples of the halogen-containing elastomer [I] used in this invention include polymers of epihalohydrins; epihalohydrin rubbers which are the copolymers of epihalohydrins with other epoxides; halogen-containing acrylic rubbers which are the copolymers of ethyl acrylate, chlorine-containing monomers such as vinyl chloroacetate or vinylbenzyl chloroacetate and optionally other acrylates; halogenated (particularly, chlorinated) polyethylenes; halo(particularly, chloro)sulfonated polyethylenes; chloroprene rubber; and halogenated (particularly, chlorinated or brominated)butyl rubbers.

The di- and tri-thiol-s-triazine compound [II] is a compound represented by the general formula

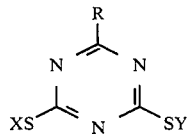

wherein X and Y each represent hydrogen, an alkali metal or an alkaline earth metal; R represents $OR_1$, $SR_1$ or $NR_1R_2$; and each of $R_1$ and $R_2$ represents hydrogen or a hydrocarbon group having 1 to 20 carbon atoms which may have a substituent, or $R_1$ and $R_2$ in $NR_1R_2$ may be linked to each other at the other ends to form a ring. The hydrocarbon residue may include, for example, alkyl groups such as methyl, ethyl, butyl and ethylhexyl; cycloalkyl groups such as cyclohexyl; aralkyl groups such as benzyl, methylbenzyl and ethylbenzyl; aryl or substituted aryl groups such as phenyl, naphthyl, butylphenyl and hydroxy-di-t-butylphenyl; and alkenyl groups such as allyl and oleyl. Examples of the ring formed by $R_1$ and $R_2$ linked to each other at the other ends are morpholino, piperidyl and pipecolyl.

Specific examples of the compound [II] include
2,4,6-trimercapto-s-triazine,
2-methoxy-4,6-dithiol-s-triazine,
2-ethoxy-4,6-dithiol-s-triazine,
2-phenoxy-4,6-dithiol-s-triazine,
2-butylamino-4,6-dithiol-s-triazine,
2-anilino-4,6-dithiol-s-triazine,
2-naphthylamino-4,6-dithiol-s-triazine,
2-dimethylamino-4,6-dithiol-s-triazine,
2-diethylamino-4,6-dithiol-s-triazine,
2-butylamino-4,6-dithiol-s-triazine,
2-diphenylamino-4,6-dithiol-s-triazine,
2-dicyclohexylamino-4,6-dithiol-s-triazine,
2-morpholino-4,6-dithiol-s-triazine, and
2-piperidyl-4,6-dithiol-s-triazine; and
sodium, potassium, calcium, magnesium and barium salts of these triazines.

The polycarboxylic acid compound [III] is selected from the group consisting of (A) a polycarboxylic acid and (B) a halogen-substituted polycarboxylic acid anhydride (B).

The polycarboxylic acid (A) is a compound which has at least two carboxyl groups capable of forming an acid anhydride group in the molecule (i.e., at least two carboxyl groups located in proximity to each other within the molecule), and includes aromatic compounds having such a ring as a benzene, naphthalene, pyridine or furane ring, and alicyclic compounds having such a ring as a cyclopentane, cyclopentene or cyclohexane ring. These compounds may optionally contain an oxygen atom, a sulfur atom, a nitrogen atom or a multiple bond in the molecular chains. Furthermore, to an extent of not adversely affecting their performance, these compounds may also be substituted at its hydrogen atom in the molecule by a halogen atom, an alkyl group, an alkoxy group, an acyl group, a hydroxyl group, a nitrile group, an amino group, etc.

Specific examples of the polycarboxylic acids (A) are oxalic acid, malonic acid, methylmalonic acid, ethylmalonic acid, succinic acid, methylsuccinic acid, chlorosuccinic acid, dibromosuccinic acid, malic acid, glutaric acid, methylglutaric acid, propane-1,2,3-tricarboxylic acid, citric acid, adipic acid, ethyladipic acid, maleic acid, methylmaleic acid, chloromaleic acid, bromomaleic acid, itaconic acid, citraconic acid, cis-glutaconic acid, aconitic acid, cis-alpha-dihydromuconic acid, cis-cismuconic acid, o-phthalic acid, 3-methyl-o-phthalic acid, 4-methyl-o-phthalic acid, 3-ethyl-o-phthalic acid, 3-butyl-o-phthalic acid, 3-octyl-o-phthalic acid, 3-chloro-o-phthalic acid, 4-chloro-o-phthalic acid, 4,5-dichloro-o-phthalic acid, tetrachloro-o-phthalic acid, tetrabromo-o-phthalic acid, 4-nitro-o-phthalic acid, 4,5-dinitro-o-phthalic acid, homophthalic acid, methylhomophthalic acid, hemimellitic acid, trimellitic acid, mellophanic acid, pyromellitic acid, naphthalene-1,2-dicarboxylic acid, naphthalene-2,3-dicarboxylic acid, cis-1,2-cyclohexenedicarboxylic acid, and trans-1,2-cyclohexenedicarboxylic acid.

The halogen-substituted polycarboxylic acid anhydride (B) is a compound which has at least one acid anhydride group formed by at least two carboxyl groups located in proximity to each other in the molecule and in which at least one hydrogen atom is substituted by halogen. Examples include halogenated products of linear aliphatic compounds having up to 20 carbon atoms, aromatic compounds having such a ring as a benzene, naphthalene, pyridine or furane ring, and alicyclic compounds having such a ring as a cyclopentane, cyclopentene or cyclohexane ring. These compounds may optionally include an oxygen atom, a sulfur atom, a nitrogen atom or a multiple bond in the molecular chains. Furthermore, to an extent of not adversely affecting their performance, they may be substituted at its hydrogen atom in the molecular by an alkyl group, an alkoxy group, an acyl group, a hydroxyl group, a nitrile group, an amino group, etc.

Specific examples of the halogen-substituted polycarboxylic acid anhydride (B) include chlorosuccinic anhydride, 2-chloro-3-methylsuccinic anhydride, 2-chloro-3-methylsuccinic anhydride, 2,3-dichlorosuccinic anhydride, 2,3-dibromosuccinic anhydride, 2-hydroxy-3-chlorosuccinic anhydride, 5-chloroglutaric anhydride, 1,3-dichloro-propane-1,2,3-tricarboxylic anhydride, 3,4-dichloroadipic anhydride, 2,3,4,5-tetrachloroadipic anhydride, chloromaleic anhydride, bromomaleic anhydride, dichloromaleic anhydride, dibromomaleic anhydride, chloromethylmaleic anhydride, chlorophthalic anhydride, bromophthalic anhydride, 4,5-dichlorophthalic anhydride, 4,5-dibromophthalic anhydride, tetrachlorophthalic anhydride, tetrabromophthalic anhydride, 5-chlorohemimellitic anhydride, dichloromellophanic anhydride, dichloropyromellitic anhydride, 3,4-dichloro-naphthalene-1,2-dicarboxylic anhydride, 4,5-dichloro-cis-cyclohexenedicarboxylic anhydride, and 4,5-dibromo-cis-cyclohexenedicarboxylic anhydride.

Usually, per 100 parts by weight of the halogen-containing elastomer [I], the di- or tri-thiol-s-triazine compound [II] is used in an amount of 0.1 to 10 parts by weight, preferably 0.5 to 5 parts by weight, and the polycarboxylic acid compound [III], in an amount of 0.1 to 10 parts by weight, preferably 0.3 to 5 parts by weight.

The elastomer composition of this invention may further include ordinary compounding chemicals such as reinforcing agents, fillers, softening agents, plasticizers, vulcanization aids (such as the oxides, hydroxides, carbonates and organic acid salts of metals), antioxidants, stabilizers and scorch retarders, as required.

When the elastomer composition of this invention is heated usually at a temperature of 100° to 180° C. for several minutes to several hours, a vulcanizate of good performance can be formed while its scorch is inhibited.

The compound used in this invention to inhibit scorch has far smaller adverse effects on the properties of vulcanizates such as tensile properties and permanent compression set than known retarders, and are therefore of a high industrial value.

The following examples illustrate the present invention more specifically. All parts representing the amounts of the elastomers and compounding chemicals in the following examples are by weight.

EXAMPLE 1

In each run, 100 parts of an epichlorohydrinethylene oxide copolymer rubber ("Herclor C-85", a tradename for a product of Hercules Incorporated), 2 parts of stearic acid, 40 parts of FEF carbon, 3 parts of magnesia, 5 parts of calcium carbonate, 0.9 part of 2,4,6-trimercapto-s-triazine and 2 parts of each of the polycarboxylic acids shown in Table 1 were roll-kneaded. The Mooney scorch time of the resulting composition was measured. The results are shown in Table 1.

TABLE 1

| Run No. | | Polycarboxylic acid | Mooney scorch time (minutes, 125° C. ML) |
|---|---|---|---|
| Comparison | 1 | — | 3.7 |
| | 2 | Fumaric acid | 4.0 |
| Invention | 3 | Oxalic acid | 5.5 |
| | 4 | Malonic acid | 9.0 |
| | 5 | Succinic acid | 5.5 |
| | 6 | Glutaric acid | 6.1 |
| | 7 | Ethylmalonic acid | 7.9 |
| | 8 | Malic acid | 6.8 |
| | 9 | Citric acid | 6.4 |
| | 10 | Propane-1,2,3-tricarboxylic acid | 5.8 |
| | 11 | Maleic acid | 13.6 |
| | 12 | Methylmaleic acid | 7.5 |

EXAMPLE 2

In each run, an elastomeric composition was prepared, and its scorch time was measured, in the same way as in Example 1 except that an epichlorohydrin-/ethylene oxide/allyl glycidyl ether terpolymer rubber ("Zechron 3100", a tradename for a product of Nippon Zeon Co., Ltd.) was used as the halogen-containing elastomer, and each of the polycarboxylic acids shown in Table 2 was used. The results are shown in Table 2.

TABLE 2

| Run No. | | Polycarboxylic acid | Mooney scorch time (minutes, 125° C. ML) |
|---|---|---|---|
| Comparison | 13 | — | 4.6 |
| | 14 | m-Phthalic acid | 4.9 |
| | 15 | p-Phthalic acid | 4.3 |
| | 16 | Phthalic anhydride | 5.1 |
| Invention | 17 | o-Phthalic acid | 11.2 |
| | 18 | 3-Nitrophthalic acid | 7.5 |
| | 19 | Homophthalic acid | 6.8 |
| | 20 | Trimellitic acid | 9.7 |
| | 21 | Pyromellitic acid | 11.8 |
| | 22 | Tetrachloro-o-phthalic acid | 8.4 |
| | 23 | Tetrabromo-o-phthalic acid | 7.2 |

EXAMPLE 3

In each run, a compound of an epichlorohydrinethylene oxide copolymer rubber ("Herclor C-85") was prepared in accordance with the following compounding recipe, and then heated at 160° C. for 30 minutes under pressure to produce a vulcanizate. The properties of the vulcanizate were measured in accordance with JIS K-6301. The results are shown in Table 3.

| Compounding Recipe (parts) | |
|---|---|
| Herclor C-85 | 100 |
| Stearic acid | 2 |
| FEF carbon | 40 |
| Magnesia | 3 |
| Calcium carbonate | 5 |
| 2,4,6-Trimercapto-s-triazine | 0.9 |
| Nickel dibutyldithiocarbamate | 1 |
| Cyclohexylthiophthalimide | 1 |
| Polycarboxylic acid (see Table 3) | 1 |

TABLE 3

| Test items | Run No. Comparison 24 None | Run No. Invention 25 o-Phthalic acid | Run No. Invention 26 Malonic acid | Run No. Invention 27 Maleic acid |
|---|---|---|---|---|
| | | Polycarboxylic acid | | |
| Mooney scorch time (min.) (125° C. ML) | | | | |
| Immediately after preparation | 6.7 | 13.1 | 11.3 | 8.5 |
| 14 days later | 4.3 | 7.0 | 7.8 | 6.3 |
| Properties in a normal condition | | | | |
| Tensile strength (kg/cm$^2$) | 148 | 145 | 138 | 140 |
| Elongation (%) | 400 | 520 | 520 | 490 |
| Hardness (JIS) | 65 | 64 | 64 | 64 |
| Permanent compression set (18%) | | | | |
| After 70 hours at 135° C. | 37 | 43 | 41 | 39 |

Table 3 demonstrates that the use of the polycarboxylic acids (invention) inhibited scorch, and the vulcanizates obtained thereby show tensile properties equivalent to those obtained when no polycarboxylic acid was added (comparison). The permanent compression sets in the examples of the invention were a little bit higher than than obtained in the comparison. But in view of the fact that when an ordinary scorch retarder is used, the permanent compression set becomes much higher, it will be understood that the polycarboxylic acids used in accordance with this invention are very good scorch retarders.

EXAMPLE 4

In each run, 100 parts of an epichlorohydrinethylene oxide copolymer rubber ("Herclor C-85"), 2 parts of stearic acid, 40 parts of FEF carbon, 3 parts of magnesia, 5 parts of calcium carbonate, 2 parts of 2-dibutylamino-4,6-dimercapto-s-triazine and o-phthalic acid in the amounts indicated in Table 4 were used, and the same experiment as in Example 1 was carried out. The results are shown in Table 4.

TABLE 4

| Run No. | Comparison 28 | Invention 29 |
|---|---|---|
| Amount of o-phthalic acid added (parts) | 0 | 2 |
| Mooney scorch (125° C. ML) | | |
| Minimum viscosity | more than 200 | 101.0 |
| t$_5$ (minutes) | could not be measured. | 1.8 |
| t$_{35}$ (minutes) | could not be measured. | 2.8 |

EXAMPLE 5

The same experiment as in Example 1 was carried out by using 100 parts of a chlorinated acrylic rubber (Nipol AR71", a tradename for a product of Nippon Zeon Co., Ltd.), 1 part of stearic acid, 50 parts of MAF carbon, 3 parts of magnesia, 1 part of morpholine disulfide, 1.5 parts of 2,4,6-trimercapto-s-triazine and o-phthalic acid in the amounts indicated in Table 5. The results are shown in Table 5.

TABLE 5

| Run No. | Comparison 30 | Invention 31 |
|---|---|---|
| Amount of o-phthalic acid added (parts) | 0 | 2 |
| Mooney scorch (125° C. ML) | | |
| Minimum viscosity | 101.5 | 72.0 |
| t$_5$ (minutes) | 2.0 | 4.1 |
| t$_{35}$ (minutes) | 2.6 | 5.3 |

EXAMPLE 6

In each run, a composition of an epichlorohydrin-/ethylene oxide/allyl glycidyl ether terpolymer rubber ("Zechron 3100") formed in accordance with the compounding recipe shown in Table 6 was prepared by roll kneading, and its Mooney scorch time and vulcanization torque by an oscillating disc rheometer were measured. The results are shown in Table 6.

TABLE 6

| | Run No. | Invention 32 | Invention 33 | Comparison 34 | Comparison 35 |
|---|---|---|---|---|---|
| Compounding recipe | Zechron 3100 | 100 | 100 | 100 | 100 |
| | Stearic acid | 3 | 3 | 3 | 3 |
| | FEF carbon black | 40 | 40 | 40 | 40 |
| | Magnesia | 3 | 3 | — | — |
| | Calcium carbonate | 5 | 5 | — | — |
| | Red lead | — | — | 5 | 5 |
| | 2,4,6-Trimercaptos-triazine | 0.9 | 0.9 | — | — |
| | 2-Mercaptoimidazoline | — | — | 1.2 | 1.2 |
| | Nickel dibutyl-dithiocarbamate | 1 | 1 | 1 | 1 |
| | Malic acid | 2 | — | 2 | — |
| Mooney scorch (125° C. ML) | | | | | |
| Minimum viscosity | | 65.0 | 64.0 | 50.0 | 55.5 |
| t$_5$ (minutes) | | 6.9 | 4.7 | 10.9 | 7.1 |
| t$_{35}$ (minutes) | | 10.9 | 8.5 | 15.3 | 10.3 |
| Vulcanization torque (after 30 minutes at 160° C.; kg · cm) | | 43 | 48 | 22 | 39 |

Table 6 shows that with the 2-mercaptoimidazoline vulcanization system (comparison), the addition of malic acid produced a scorch improving effect, but the torque was low even after 30 minutes and the degree of vulcanization did not increase, whereas with the 2,4,6-trimercapto-s-triazine vulcanization system (invention), the addition of malic acid produced a scorch improving effect and the decrease of the degree of vulcanization was little.

EXAMPLE 7

In each run, 100 parts of an epichlorohydrinethylene oxide copolymer rubber ("Herclor C-85"), 3 parts of stearic acid, 40 parts of FEF carbon, 3 parts of magnesia, 5 parts of calcium carbonate, 0.9 part of 2,4,6-trimercapto-s-triazine and a predetermined amount (corresponding to $6.4 \times 10^{-3}$ mole) of each of the polycarboxylic acid anhydrides shown in Table 7 were roll-kneaded, and the Mooney scorch time of the resulting rubber composition was measured. The results are shown in Table 7.

Table 7 demonstrates that the use of polycarboxylic anhydrides not substituted by halogen (Runs Nos. 37 and 38) scarcely produced an effect of inhibiting scorch.

TABLE 7

| Run No. | | Polycarboxylic acid anhydride Type | Amount (parts) | Mooney scorch time (min.) (125° C. ML) |
|---|---|---|---|---|
| Comparison | 36 | — | — | 4.8 |
| | 37 | Maleic anhydride | 0.63 | 5.1 |
| | 38 | Phthalic anhydride | 0.95 | 4.9 |
| Invention | 39 | Chloromaleic anhydride | 0.85 | 6.2 |
| | 40 | Dichloromaleic anhydride | 1.07 | 6.0 |
| | 41 | Tetrachlorophthalic anhydride | 1.83 | 7.1 |
| | 42 | Tetrabromophthalic anhydride | 2.96 | 6.3 |

EXAMPLE 8

In each run, 100 parts of epichlorohydrin/ethylene oxide/allyl glycidyl ether terpolymer rubber ("Zechron 3100"), 3 parts of stearic acid, 40 parts of FEF carbon, 3 parts of magnesia, 5 parts of calcium carbonate, 0.9 part of 2,4,6-trimercapto-s-triazine, 1 part of cyclohexylthiophthalimide, 1 part of nickel dibutyldithiocarbamate and a predetermined amount (corresponding to $6.4 \times 10^{-3}$ mole) of each of the halogen-substituted polycarboxylic acid anhydrides shown in Table 8 were roll-kneaded, and the Mooney scorch time of the resulting rubber composition was measured. The results are shown in Table 8.

TABLE 8

| Run No. | | Halogen-substituted polycarboxylic acid anhydride Type | Amount (parts) | Mooney scorch time (min.) (125° C. ML) |
|---|---|---|---|---|
| Comparison | 43 | — | — | 9.3 |
| Invention | 44 | Chloromaleic anhydride | 0.85 | 14.2 |
| | 45 | Dichloromaleic anhydride | 1.07 | 16.6 |
| | 46 | Tetrachlorophthalic anhydride | 1.83 | 15.3 |
| | 47 | Tetrabromophthalic anhydride | 2.96 | 11.6 |

EXAMPLE 9

A compound of an epichlorohydrin/ethylene oxide/allyl glycidyl ether terpolymer rubber ("Zechron 3100") was prepared in accordance with the following compounding recipe, and then heated under pressure at 160° C. for 30 minutes to prepare a vulcanizate. The properties of the vulcanizate were measured in accordance with JIS K-6301. The results are shown in Table 9.

| Compounding recipe (parts) | |
|---|---|
| Zechron 3100 | 100 |
| Stearic acid | 3 |
| FEF carbon | 40 |
| Magnesia | 1.5 |
| Calcium carbonate | 5 |
| 2,4,6-Trimercapto-s-triazine | 0.9 |
| Nickel dibutyldithiocarbamate | 1 |
| Cyclohexylthiophthalimide | 1 |
| Halogen-substituted polycarboxylic acid anhydride (see Table 9) | |

TABLE 9

| | Run No. | | |
|---|---|---|---|
| | Comparison | Invention | |
| | 48 | 49 | 50 |
| | Halogen-substituted polycarboxylic anhydride | | |
| Test items | Not added | Tetrachlorophthalic anhydride (2.0 parts; $7.0 \times 10^{-3}$ mole) | Tetrabromophthalic anhydride (2.0 parts; $4.1 \times 10^{-3}$ mole) |
| Mooney scorch time (min) (125° C. ML) | | | |
| Immediately after preparation of the compound | 9.6 | 16.7 | 13.0 |
| 14 days after preparation of the compound | 6.2 | 12.0 | 10.7 |
| Properties in a normal condition | | | |
| Tensile strength (kg/cm$^2$) | 137 | 139 | 139 |
| Elongation (%) | 370 | 520 | 490 |
| Hardness (JIS) | 65 | 63 | 63 |
| Aging test in heated air (after 240 hours at 135° C.) | | | |
| Percent change in tensile strength (%) | −12 | −9 | −10 |
| Percent change in elongation (%) | −62 | −67 | −65 |
| Change in hardness (point) | +7 | +7 | +7 |

Table 9 demonstrates tht the use of the halogen-substituted polycarboxylic acid anhydrides inhibited scorch and the resulting vulcanizates showed properties equivalent to those obtained when no halogen-substituted polycarboxylic acid anhydride was added.

EXAMPLE 10

The same experiment as in Example 7 was carried by using 100 parts of a chlorinated acrylic rubber ("Nipol AR71"), 1 part of stearic acid, 50 parts of MAF carbon, 3 parts of magnesia, 1 part of morpholine disulfide, 1.5 parts of 2,4,6-trimercapto-s-triazine and tetrachlorophthalic anhydride in the amounts in Table 10. The results are shown in Table 10.

TABLE 10

| Run No. | Comparison 51 | Invention 52 |
|---|---|---|
| Amount of tetrachlorophthalic anhydride added (parts) | 0 | 2.0 ($7.0 \times 10^{-3}$ mole) |

TABLE 10-continued

| Run No. | Comparison 51 | Invention 52 |
|---|---|---|
| Mooney scorch (125° C. ML) | | |
| Minimum viscosity | 79.0 | 71.0 |
| t₅ (minutes) | 2.4 | 4.0 |
| t₃₅ (minutes) | 3.3 | 5.5 |

What is claimed is:

1. An elastomer composition whose scorch is inhibited, said composition comprising (I) a halogen-containing elastomer selected from the group consisting of polymers of epihalohydrins, epihalohydrin rubbers, and halogen-containing acrylic rubbers, (II) a di- or tri-thiol-s-triazine compound and (III) at least one polycarboxylic acid compound selected from the group consisting of (A) a polycarboxylic acid having at least two carboxyl groups capable of forming an acid anhydride group in the molecule and (B) a halogen-substituting polycarboxylic acid anhydride.

2. The composition of claim 1 wherein the di- or tri-thiol-s-triazine compound (II) is a compound represented by the general formula

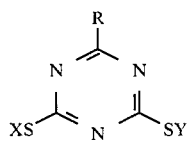

wherein X and Y each represent hydrogen, an alkali metal or an alkaline earth metal; R represents $OR_1$, $SR_1$ or $NR_1R_2$; and each of $R_1$ and $R_2$ represents hydrogen or a hydrocarbon group having 1 to 20 carbon atoms which may be substituted by a hydroxyl group, or $NR_1R_2$ may be morpholino, piperidyl or pipecolyl group.

3. The composition of claim 1 wherein the polycarboxylic acid compound [III] is selected from the group consisting of aliphatic compounds having up to 20 carbon atoms, aromatic compounds and alicyclic compounds.

4. The composition of claim 1 wherein the amount of the di- or tri-thiol-s-triazine compound [II] is 0.1 to 10 parts by weight per 100 parts by weight of the halogen-containing elastomer.

5. The composition of claim 1 wherein the content of the polycarboxylic acid compound [III] is 0.1 to 10 parts by weight per 100 parts by weight of the halogen-containing elastomer.

6. The composition of claim 1 wherein the di- or tri-thiol-s-triazine compound [II] is a compound selected from the group consisting of 2,4,6-trimercapto-s-triazine, 2-methoxy-4,6-dithiol-s-triazine, 2-ethoxy-4,6-dithiol-s-triazine, 2-phenoxy-4,6-dithiol-s-triazine, 2-butylamino-4,6-dithiol-s-triazine, 2-anilino-4,6-dithiol-s-trizine, 2-naphthylamino-4,6-dithiol-s-triazine, 2-dimethylamino-4,6-dithiol-s-triazine, 2-diethylamino-4,6-dithiol-s-triazine, 2-dibutylamino-4,6-dithiol-s-triazine, 2-diphenylamino-4,6-dithiol-s-triazine, 2-dicyclohexylamino-4,6-dithiol-s-triazine, 2-morpholino-4,6-dithiol-s-triazine, 2-piperidyl-4,6-dithiol-s-triazine, and the sodium, potassium, calcium, magnesium and barium salts thereof.

7. The composition of claim 1 wherein the polycarboxylic acid is the halogen-substituted polycarboxylic acid anhydride (B).

8. The composition of claim 1 wherein the component [II] is a tri-thiol-s-triazine compound.

9. The composition of claim 8 wherein the tri-thiol-s-triazine compound is 2,4,6-trimercapto-s-triazine. ,23

10. The composition of claim 1 wherein the polycarboxylic acid compound is selected from the group consisting of oxalic acid, malonic acid, succinic acid, glutaric acid, ethyl-malonic acid, malic acid, citric acid, propane-1,2,3-tricarboxylic acid, maleic acid, methylmaleic acid, o-phthalic acid, 3-nitrophthalic acid, homophthalic acid, trimellitic acid, pyromellitic acid, tetrachloro-o-phthalic acid and tetrabromo-o-phthalic acid.

11. The composition of claim 7 wherein the halogen-substituted polycarboxylic acid anhydride is selected from the group consisting of chloromaleic anhydride, dichloromaleic anhydride, tetrachlorophthalic anhydride and tetrabromo-phthalic anhydride.

* * * * *

UNITED STATES PATENT AND TRADEMARK OFFICE
CERTIFICATE OF CORRECTION

PATENT NO. : 4,569,958
DATED : February 11, 1986
INVENTOR(S) : AKIO MAEDA, ET AL.

It is certified that error appears in the above-identified patent and that said Letters Patent is hereby corrected as shown below:

IN THE CLAIMS

Claim 9, line 2, (column 10, line 31), delete ",23".

Signed and Sealed this

Twenty-second Day of April 1986

[SEAL]

Attest:

DONALD J. QUIGG

Attesting Officer    Commissioner of Patents and Trademarks